(12) United States Patent
Wan et al.

(10) Patent No.: US 11,182,352 B2
(45) Date of Patent: Nov. 23, 2021

(54) EXCHANGING RUNTIME STATE INFORMATION BETWEEN DATACENTERS USING A CONTROLLER BRIDGE

(71) Applicant: VMware, Inc., Palo Alto, CA (US)

(72) Inventors: Da Wan, Beijing (CN); Jianjun Shen, Beijing (CN); Feng Pan, Beijing (CN); Pankaj Thakkar, Cupertino, CA (US); Donghai Han, Beijing (CN)

(73) Assignee: VMware, Inc., Palo Alto, CA (US)

( * ) Notice: Subject to any disclaimer, the term of this patent is extended or adjusted under 35 U.S.C. 154(b) by 94 days.

(21) Appl. No.: 16/532,084

(22) Filed: Aug. 5, 2019

(65) Prior Publication Data

US 2021/0011780 A1 Jan. 14, 2021

(30) Foreign Application Priority Data

Jul. 8, 2019 (CN) ................................ 2019095045

(51) Int. Cl.
*G06F 16/20* (2019.01)
*G06F 9/50* (2006.01)
*G06F 9/455* (2018.01)

(52) U.S. Cl.
CPC .......... *G06F 16/20* (2019.01); *G06F 9/45558* (2013.01); *G06F 9/5083* (2013.01); *G06F 2009/4557* (2013.01); *G06F 2009/45595* (2013.01)

(58) Field of Classification Search
CPC ............... G06F 9/5083; G06F 9/45558; G06F 2009/4557; G06F 2009/45595
See application file for complete search history.

(56) References Cited

U.S. PATENT DOCUMENTS

| 10,423,493 | B1* | 9/2019 | Vig ..................... G06F 16/2322 |
| 2020/0167369 | A1* | 5/2020 | Song ....................... G06F 16/25 |
| 2020/0201827 | A1* | 6/2020 | Chacko ............... G06F 21/6218 |

OTHER PUBLICATIONS

Sharding, "Science Direct Topics", an overview, 1 page. file:// hpbbfs/Clients/VMware,%20Inc.%20(55555)/0048%20(F354.CN. WO.01)/IDS/Sharding%2020an%20overview20ScienceDirect% 20Topics.html, 2019.
Jeeyoung Kim, "How Sharding Works", Medium, dated Dec. 5, 2014, 16 pages.

* cited by examiner

*Primary Examiner* — Jacob D Dascomb

(57) ABSTRACT

In an embodiment, a computer-implemented method for dynamically exchanging runtime state data between datacenters using a controller bridge is disclosed. In an embodiment, the method comprises: requesting, and receiving, one or more first runtime state data from one or more logical sharding central control planes ("CCPs") controlling one or more logical sharding hosts; requesting, and receiving, one or more second runtime state data from one or more physical sharding CCPs controlling one or more physical sharding hosts; aggregating, to aggregated runtime state data, the one or more first runtime state data and the one or more second runtime state data; determining updated runtime state data based on the aggregated runtime state data, the one or more first runtime state data, and the one or more second runtime state data; and transmitting the updated runtime state data to the logical sharding CCPs and physical sharding CCPs.

20 Claims, 13 Drawing Sheets

EXCHANGING RUNTIME STATE INFORMATION BETWEEN DATACENTERS USING A CONTROLLER BRIDGE

BENEFIT CLAIM

Benefit is claimed under 35 U.S.C. 119(a)-(d) to Foreign Application Serial No. 2019095045 filed in China entitled "EXCHANGING RUNTIME STATE INFORMATION BETWEEN DATACENTERS USING A CONTROLLER BRIDGE", on Jul. 8, 2019, by VMware, Inc., which is herein incorporated in its entirety by reference for all purposes.

BACKGROUND

Software defined networking ("SDN") usually includes a logical overlay network implemented by hosts that communicate with each other over the physical network infrastructure. A host usually supports virtualized endpoints that may include virtual machines ("VMs"), containers, and other computing instances connected to the logical overlay network.

A typical SDN network is managed by a management plane ("MP") and a central control plane ("CCP"). The MP is configured to receive logical overlay network configuration input from an administrator and generate desired state data that specifies how the logical overlay network should be implemented in the physical network infrastructure.

Based on the state data, the CCP implements and maintains the logical overlay network topology that also includes logical switches, logical routers, endpoints, etc. The CPP does this by taking the logical overlay network topology configuration information and translating it into physical network configuration data that is then communicated to local controllers and network elements implemented in the hosts. An example control plane logical network controller is described in U.S. Pat. No. 9,525,647 entitled "Network Control Apparatus and Method for Creating and Modifying Logical Switching Elements," which is fully incorporated herein by reference.

The network configuration data may include, for example, forwarding table entries that are used to populate forwarding tables at virtual switches provided by hypervisors. A hypervisor is computer software, firmware or hardware that creates and runs VMs.

Implementing a VM in a datacenter may include defining the VM as part of a logical Layer 2 network implemented by a collection of virtual switches configured on the hosts of the datacenter. Each logical network and switch may be assigned a virtual network identifier ("VNI"). A virtual switch operates as a physical managed edge switch that is implemented in software by a hypervisor on the host and that is configured to use the forwarding table information to forward traffic.

Hosts implement tunnels for forwarding logical overlay network traffic between virtual machines on different hosts over a physical underlay network. Each host may have one or more tunnel endpoints (VTEPs). As used herein, "VTEP" simply refers to a tunnel endpoint regardless of the tunneling protocol used. Additional forwarding tables are maintained by the hypervisor to store information that the VTEPs use to encapsulate packets to facilitate communications over the tunnels. A packet from a source VM is encapsulated at a source VTEP with an outer Internet Protocol ("IP") header addressing a destination host according to a destination VM to destination host mapping included in the forwarding table. The encapsulated packet may be routed via physical routers and switches of a physical network underlay to the destination host. The network tunnel established by the source and destination hosts may extend the logical network between different physical network domains such that source and destination VMs may correspond as though they are on the same Layer 2 (of the OSI Model) broadcast domain but actually reside in any arbitrary location so long as the hosts have Layer 3 physical network connectivity. Upon detecting the packet at the destination host, a destination VTEP decapsulates the packet and directs the packet to the destination VM.

SDN environment may include one or more datacenters. In the single datacenter SDN environment, a CCP is responsible for exchanging runtime data among transport nodes of the datacenter. In the multiple datacenter SDN environments, the datacenters may include hosts that are parts of different SDN environments and thus are controlled by different MPs/CCPs. However, the hosts that are part of different datacenters may still be configured to communicate with one another and may host VMs connected to the same logical switch. In the multiple datacenter SDN environment, CCPs exchange runtime data between the datacenters.

A datacenter migration usually occurs when a datacenter transitions from implementing one control plane software to implementing different control plane software. In other words, the hosts in one datacenter may be migrated from being managed by one control plane to another control plane. A control plane may include a central control plane implemented by a controller or a cluster of controllers which each may be implemented as a physical server or a virtual machine in the datacenter or virtual machines. A datacenter migration may be needed when upgrading from one version of control plane software to another, or when changing between different vender software. Performing the overlay runtime state migration is a critical part of the datacenter migration because otherwise the datapath traffic could not be correctly forwarded between the datacenters' VMs.

Typically, there are several approaches for exchanging runtime state for migrating a datacenter between control planes. One is static, and another is dynamic. In a static exchange, the runtime state information is received from an old system and fetched to a new system, and during the exchange the state information is frozen. In a dynamic exchange, the runtime state information is exchanged between the systems dynamically and without freezing the state data. The static approach is simple to implement, but it is often error-prone. The dynamic approach is difficult to implement to handle the exchange correctly.

A datacenter federation usually occurs when several datacenters are merged, or federated, into one logical datacenter. Federation allows stretching the fabric of multiple datacenters, and therefore, requires replicating the runtime state of one datacenter across other datacenters in the federation. The federation may occur when, for example, a user creates a global logical switch spanning across multiple datacenters to allow VMs to connect to the global logical switch and communicate with each other smoothly and without noticing the underlay infrastructure, even though the VMs might be located in different physical datacenters in different geographical regions.

Exchanging the runtime state information, such as contents of VTEP tables and MAC/VTEP mappings is often necessary to maintain the normal functioning of the datacenter federation. The runtime state exchange includes replicating the state information of each datacenter across the multiple datacenters, so that each local datacenter can obtain the runtime state of the remote datacenters. Furthermore, if any runtime state change takes place in a local datacenter, then the change needs to be replicated to all remote datacenters to notify them about the local changes and to instruct them how to forward the traffic on remote peers.

Supporting both the datacenter migration and the datacenter federation is difficult because different control planes may have different architectures or be differently managed.

SUMMARY

In an embodiment, an approach for dynamically exchanging runtime state information using a controller bridge is disclosed. The approach is applicable to both a datacenter migration and a datacenter federation. Specifically, the approach allows exchanging the runtime state information when one datacenter implementing one SDN product line migrates to implementing another SDN product line. The approach also allows exchanging the runtime state information when multiple hosts and/or datacenters are federated into one federated datacenter. Furthermore, the approach supports a dynamic exchange of overlay runtime state with and without gateways. The approach supports the dynamic exchange of overlay runtime state with no substantial modifications to the existing architecture of the datacenters.

The approach for exchanging runtime state information may be performed by a controller bridge also referred to as a migration/federation coordinator. The controller bridge may be configured in any of the datacenters, including the datacenters that either migrate or are federated.

The approach allows exchanging the runtime state information for all types of sharding, including a physical sharding, a logical sharding, and a combination of both. Sharding is a method of distributing workloads across SDN CCP cluster nodes and includes dividing the SDN CCP cluster workloads into different shards (i.e., portions) so that each SDN CCP cluster instance has a relatively equal portion of the workload to process.

In an embodiment, each of logical sharding hosts is running at least one VTEP, of one or more first VTEPs, and each of physical sharding hosts is running at least one VTEP of one or more second VTEPs. Each physical sharding CCP, of one or more physical sharding CCPs, stores mappings between VNIs and the corresponding VTEPs implemented in all physical sharding hosts. In contrast, a particular logical sharding CCP, of one or more logical sharding CCPs, stores a mapping between VNIs and the corresponding VTEPs implemented in the logical sharding hosts that the particular logical sharding CCP manages.

In an embodiment, a method comprises requesting, and receiving, one or more first runtime state data from one or more logical sharding CCPs controlling one or more logical sharding hosts and requesting, and receiving, one or more second runtime state data from one or more physical sharding CCPs controlling one or more physical sharding hosts. The runtime state data may include forwarding table information, such as a mapping between VNIs of logical routers configured in the sharding hosts and VTEPs established within a logical network.

The method further comprises aggregating, to aggregated runtime state data, the one or more first runtime state data received from the one or more logical sharding CCPs and the one or more second runtime state data received from the one or more physical sharding CCPs.

For each logical sharding CCP, the control bridge determines a first update state information as a difference between the aggregated runtime state data and a first runtime state data, from the one or more first runtime state data, provided by the logical sharding CCP of the one or more logical sharding CCPs; and transmitting the first update state information to the logical sharding CCP.

The method further comprises determining a first summary by combining the one or more second runtime state data and determining a second update state information as a difference between the aggregated runtime state data and the first summary; and transmitting the second update state information to a particular physical CCP of the one or more physical sharding CCPs.

In an embodiment, the method comprises receiving, by a logical sharding CCP, of the one or more logical sharding CCPs, the first update state information, and causing the logical sharding CCP to use the first update state information to update a mapping between VNIs and the corresponding VTEPs implemented in the logical sharding hosts managed by the logical sharding CCP.

In an embodiment, the method comprises receiving, by a particular physical sharding CCP of the one or more physical sharding CCP, the second update state information, and causing the particular physical sharding CCP to store the second update state information in a mapping between VNIs and the corresponding VTEPs implemented in the physical sharding hosts managed by the particular physical sharding CCP.

Also described herein are embodiments of one or more non-transitory computer readable media comprising instructions which, when executed by one or more computer processors, cause the one or more computer processor to perform method for exchanging runtime state information between datacenters using a controller bridge described above.

Also described herein are embodiments of a computer system comprising one or more processors, one or more memory units, and one or more non-transitory computer-readable storage media storing one or more computer instructions which, when executed by the one or more processors, cause the one or more processors to perform the method for exchanging runtime state information between datacenters using a controller bridge described above.

DETAILED DESCRIPTION

In the following description, for the purposes of explanation, numerous specific details are set forth in order to provide a thorough understanding of the method described herein. It will be apparent, however, that the present approach may be practiced without these specific details. In some instances, well-known structures and devices are shown in a block diagram form to avoid unnecessarily obscuring the present approach.

1. Example Physical Implementations

Figure 1:
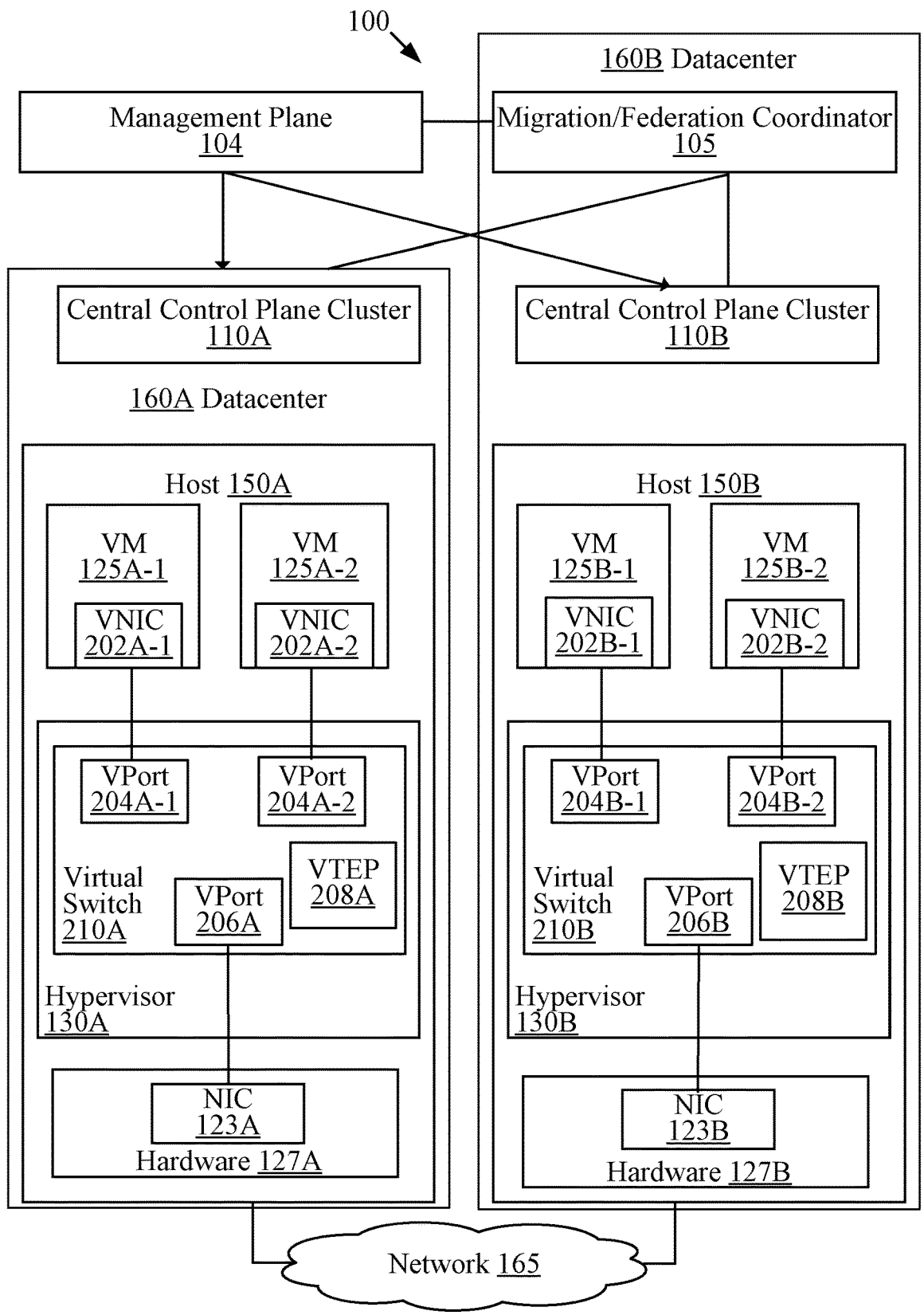
FIG. 1 is a block diagram depicting an example physical implementation view of an example logical network environment for exchanging runtime state information using a controller bridge.

FIG. 1 is a block diagram depicting an example physical implementation view of an example logical network environment for exchanging runtime state information using a controller bridge. The depicted example comprises a system 100 that includes a plurality of datacenters 160A-160B.

Datacenters 160A-160B each includes a CCP cluster 110A-110B that manages datacenters 160A-160B. A CCP of the plurality of CCP clusters 110A-110B may manage one or more hosts. The hosts may be implemented in different datacenters, and not necessarily in the same datacenter on which the CCP is implemented.

One of the datacenters may support a migration/federation coordinator 105. In the depicted example, coordinator 105 is implemented in CCP cluster 160B.

In an embodiment, datacenter 160A comprises one or more hosts 150A and datacenter 160B comprises one or more hosts 150B (only one host shown in each datacenter). Hosts 150A-150B are physical computing devices that support the execution of VMs 125A-125B, respectively.

Hosts 150A-150B may be referred to as computing devices, host computers, host devices, physical servers, server systems, or physical machines. The hosts may include hardware components such as commodity hardware computing platforms including computing processors, memory units, physical network interface cards, and storage devices (not shown).

Hosts 150A-150B are configured with virtualization layers, referred to herein as hypervisors 130A-130B, respectively. Each of hypervisors 130A-130B abstracts a processor, memory, storage, and networking resources of a corresponding hardware platform into multiple VMs 125A-125B.

Architectures of hypervisors 130A-130B may vary. In some embodiments, hypervisor 130A/130B is installed as a bare-metal installation directly on the host 150A/130B and interposed between the physical hardware and the guest operating systems executing in VMs 125A-125B. In other embodiments, hypervisor 130A/130B is implemented as an additional layer on the top of a conventional host operating system.

VMs 125A-125B are examples of virtualized computing instances or workloads. A virtualized computing instance may include an addressable data compute node or an isolated user space instance, often referred to as a name space container. Each VM 125A/125B comprises a software-based virtual network interface card ("VNIC") 202A/202B, respectively, that may be configured by a local control plane (not shown) running on host machine 150A/150B. VNICs 202A-202B provide network access for VMs 125A-125B, respectively. VNICs 202A-202B of VMs 125A-125B are typically connected to corresponding virtual ports 204A-204B of virtual network switches 210A-210B, respectively. Each virtual switch 210A/210B is a physical managed edge forwarding element implemented in software by hypervisors 130A, 130B, respectively.

Hardware 127A/127B of host 150A/150B, respectively, includes hardware components such as one or more processors (not shown), a system memory (not shown), a storage system (not shown), I/O devices, and a network interface ("NIC") 123A/123B. NIC 123A/123B enables host 150A/150B, respectively, to communicate with other devices via a communication medium, such as a network 165. NIC 123A/123B may be used to transmit data from virtual port 206A/206B to network 165.

1.1. Example Management Plane

MP 104 may include multiple computing devices that implement management plane functions. MP 104 may be responsible, for example, for receiving network configuration input through an application programming interface ("API") or a user interface, including a command-line interface or a graphical user interface. The network configuration input may specify, for example, how multiple VMs 125A-125B, executing on hosts 150A-150B may communicate with each other via a logical Layer-2 overlay network. The network configuration input may include, for example, MAC addresses of logical ports, IP addresses, and VTEPs identifiers of the logical networking elements.

Based on the network configuration input, MP 104 generates desired state data that specifies how the logical network should be implemented in the physical infrastructure. MP 104 may communicate the state data to CCP clusters 110A-110B.

1.2. Example Central Control Plane Clusters

CCP clusters 110A-110B are responsible for exchanging runtime state information. Each CCP cluster 110A/110B may comprise a plurality of CCPs to provide redundancy, reliability, fault tolerance, and load balance and the like. CCP cluster 110A/110B may include multiple controller nodes running on the top of a distributed coordination services, such as the Zookeeper or Corfu.

Runtime state information typically refers to data that can be used to instruct a datapath process (not shown) executing in hosts 150A-150B how to handle traffic encapsulation and forwarding. It may include, for example, information stored in VTEP tables and VM MAC tables. The VTEP table data and the VM MAC table data is typically associated with a logical switch which may be identified by a VNI.

Upon receiving runtime state data from MP 104, CCP clusters 110A-110B use the received state data to update a configuration of the logical network. CCP cluster 110A is responsible for managing and maintaining information about VMs 125A-1 and 125A-2, a logical switch (not shown) implemented by virtual switch 210A, virtual switch 210A itself, and VTEP 208A. creating/modifying/deleting some logical entities, the changes to the desired state are distributed as updates to CCP cluster 110A.

Upon receiving the updates, CCP cluster 110A communicates the updates to its own local controllers (not shown) implemented on each host 150A to form a local control plane. Local controllers are responsible for translating the received updates into configuration data formatted for the forwarding and/or VTEP tables. The local controller may be implemented as a daemon that operates in the virtualization software of host 150A/150B. While VTEP and forwarding tables are provided here as examples, it should be understood that other state data may be provided by the central control plane to hypervisors, including, as additional examples, access control lists and rules for distributed firewall, distributed load balancer, and middlebox insertion.

1.3. Example Controller Bridge

To facilitate a datacenter migration and/or a datacenter federation, runtime state data needs to be exchanged between CCP clusters 110A-110B. However, exchanging the runtime state data directly between CCP clusters 110A-110B is usually complex, especially if it needs to be performed dynamically. Exchanging the runtime state data between CCP clusters 110A-110B may be even more complicated if some of the hosts are managed using a logical sharding while other hosts are managed using a physical sharding.

Typically, if a transport node participates in implementing a logical switch, then the transport node receives runtime state for the logical switch from a CCP in response to sending a membership join request on behalf of the virtual switch. This, however, may become a complicated process if system 100 includes tens of thousands of hosts and virtual switches.

In an embodiment, an approach provides a special node that connects to CCP clusters 110A-110B and that is also referred to as migration/federation coordinator 105. Coordinator 105 may be configured to receive runtime state data from CCP clusters 110A-110B and/or hosts 150A-150B, aggregate the received runtime state data, generate updates based on the aggregated runtime state data and the received runtime state data, and transmit the updates to CCP clusters 110A-110B, which in turn implement the runtime state updates in forwarding tables maintained by corresponding virtual switches 210A-210B.

2. Sharding

Sharding is used to distribute workloads across SDN CCP cluster nodes. Specifically, sharding is the action of dividing SDN CCP cluster workloads into different shards (i.e., portions) so that each SDN CCP cluster instance, of a plurality of instances, has assigned a relatively equal portion of the workload.

Generally, there are two types of sharding: logical sharding and physical sharding. Each type of sharding is differently configured and managed. Therefore, the overlay runtime state data is organized and maintained differently for different types of sharding.

In an embodiment, the sharding is implemented as a functionality of a hypervisor, and the sharding runtime state data is managed by a corresponding CCP cluster.

2.1. Logical Sharding

Logical sharding may be implemented by a control plane wherein the runtime data may be organized and partitioned by logical entities, such as logical switches, logical routers and the like. If datacenter has, for example, 1200 logical switches and three controllers, and each logical switch has an associated VTEP table, then each controller may be the "master" controller for the runtime data of one third, i.e., 400, of the logical switches, and therefore be responsible for sending configuration data to each host having a VM on one of the logical networks it is responsible for as the master controller.

Logical sharding provides several benefits. Once of them is the ability to avoid storing redundant state data. Because the runtime state data for a logical switch is maintained by a particular controller, the runtime state data need not be replicated onto other controllers in a CCP cluster. Since the logical data managed by one controller node is not replicated on other controllers in the cluster, the replication effort across cluster nodes are avoided and thus the efficiency of the cluster nodes is enhanced.

2.2. Physical Sharding

With physical sharding, each controller is the master for a particular host. Since each host may have VMs on multiple different logical networks, the runtime state data for those logical networks is replicated onto all other controllers in the CCP cluster. Hence, even though the hosts are partitioned, and one controller node manages data from one partition of the hosts of the cluster, each controller maintains the runtime state data for all the hosts. If an overlay network has, for example, 1000 hosts and three controllers, then each controller may manage runtime data of ⅓ of all hosts. Each controller, however, maintains the runtime state data for all the hosts to enable traffic between the VMs that are connecting to the same logical switch, but that are located on different hosts. Since each host only reports its local VTEP to the its CCP, the runtime state data from all hosts needs to be replicated on all hosts to allow all hosts obtain the VTEP data from all hosts.

3. Runtime State Data Exchange

In an embodiment, exchanging runtime states between two datacenters, regardless of whether the exchange pertains to a datacenter migration or a datacenter federation, is implemented according to one or more state exchange patterns. The patterns include a runtime state data exchange when the datacenters are controlled using a physical sharding approach, a runtime state data exchange when the datacenters are controlled using a logical sharding approach, and a runtime state data exchange when some datacenters are controlled using a physical sharding approach and other datacenters are controlled using a logical sharding approach.

4. Runtime State Exchange from a Physical to a Physical Sharding

State exchange from a datacenter that implements a physical sharding to a datacenter that also implements a physical sharding is relatively simple. An example of a datacenter that implements a physical sharding is a datacenter using VMware NSX-T Data Center™ software. The approach described herein is particularly applicable to the datacenter federation.

Figure 2:
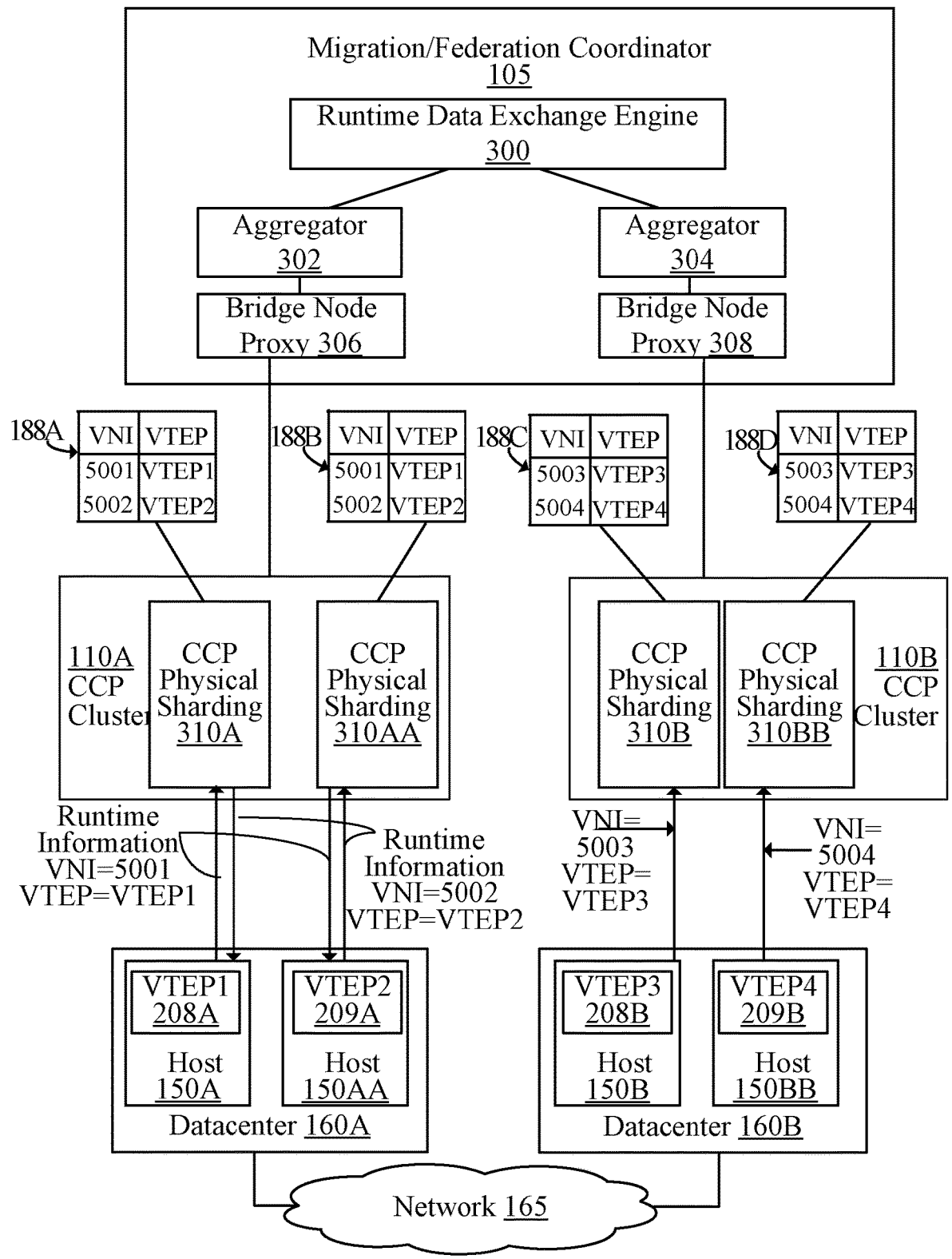
FIG. 2 is a block diagram depicting an example process for collecting runtime state information of datacenters controlled using a physical sharding approach.

FIG. 2 is a block diagram depicting an example process for collecting runtime state information of datacenters controlled using a physical sharding approach. In FIG. 2, migration/federation coordinator 105 comprises a plurality of bridge node proxies 306-308, a plurality of aggregators 302-304, and a runtime data exchange engine 300.

Bridge node proxies 306-308 may be configured to collect runtime state data from CCP clusters 110A-110B and to communicate runtime state updates to CCP clusters 110A-110B.

Aggregators 302-304 may be configured to aggregate the collected runtime data, provide the aggregated collected runtime data to runtime data exchange engine 300, and receive the runtime state updates from engine 300.

Runtime data exchange engine 300 may be configured to receive aggregated collected runtime data from aggregators 302-304, generate the runtime state updates based on the received aggregated data, and communicate the runtime state updates to aggregators 302-304.

In the depicted example, both CCP clusters 110A-110B implement physical sharding. Since CCP cluster 110A implements physical sharding, a VNI/VTEP table 188A and a VNI/VTEP table 188B include the same mappings. Furthermore, since CCP cluster 110B implements physical sharding, a VNI/VTEP table 188C and a VNI/VTEP table 188D includes the same mappings. Since CCP cluster 110A implements physical sharding, one CCP node (310A or 310AA) may be selected as a node responsible for providing the VNI/VTEP mapping to coordinator 105 and for receiving updates from coordinator 105. If any of the chosen node fails, another node in the CCP cluster is selected for providing and receiving runtime state data.

Figure 3:
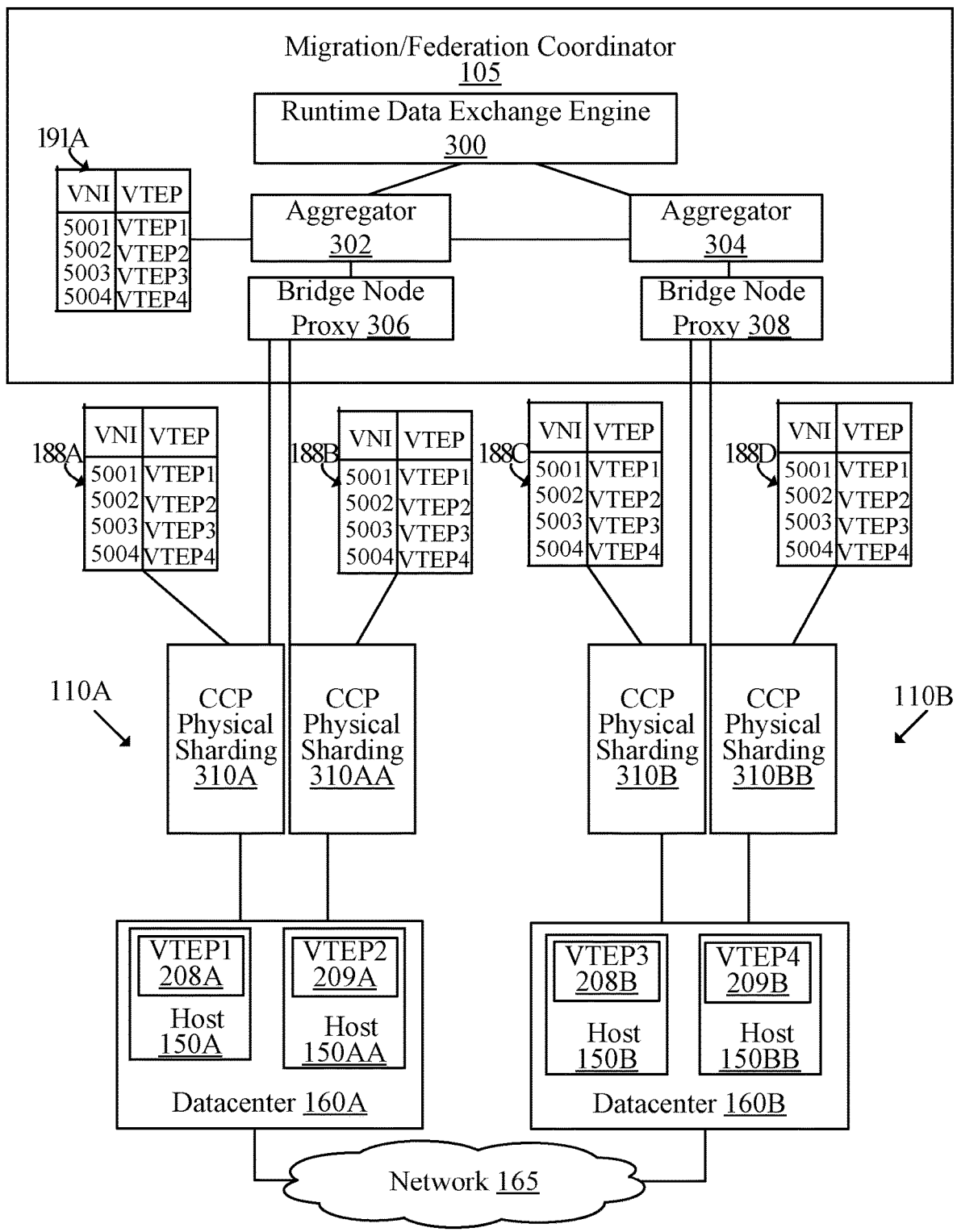
FIG. 3 is a block diagram depicting an example process for exchanging runtime state information of datacenters controlled using a physical sharding approach.

FIG. 3 is a block diagram depicting an example process for exchanging runtime state information of datacenters controlled using a physical sharding approach. Referring to FIG. 2, suppose that CCP cluster 110A implements physical sharding and suppose that CCP node 310A is selected as a node responsible for providing the VNI/VTEP mapping to coordinator 105 and for receiving updates from coordinator 105. Furthermore, suppose that CCP cluster 110B implements physical sharding and suppose that CCP 310B is selected as a node responsible for providing the VNI/VTEP mapping to coordinator 105 and for receiving runtime state updates from coordinator 105.

In the depicted example, CCP node 310A provides content of VNI/VTEP table 188A to bridge node proxy 306, while CCP node 310B provides content of VNI/VTEP table 188C to bridge node proxy 308.

Upon receiving the contents of the VNI/VTEP tables, bridge node proxies 306-308 communicate the content to aggregators 302-304, respectively.

Upon receiving the contents of the VNI/VTEP tables, aggregators 302-304, respectively, aggregate the received contents to create an aggregated a VNI/VTEP table 191A, and communicate the aggregated runtime state data to runtime data exchange engine 300.

Upon receiving the aggregated runtime state data, runtime data exchange engine 300 generates, based on the aggregated runtime state data and collected runtime state data, runtime state updates that need to be provided to CCP clusters 110A-110B so that all VNI/VTEP tables 188A, 188B, 188C and 188D contain all the VNI/VTEP mappings maintained cooperatively by all hosts 150A, 150AA, 150B and 150BB.

Once engine 300 determines the runtime state updates that need to be provided to CCP clusters 110A-110B, engine 300 communicates the updates to aggregators 302-304, respectively, which in turn, communicate the updates to proxies 306-308, respectively. Proxies 306-308 communicate the updates to CCP clusters 110A-110B, respectively, which in turn update the VNI/VTEP tables maintained by hosts 150A, 105AA, 150B, and 150BB.

5. Runtime State Exchange Between a Logical and a Logical Sharding

In a logical sharding configuration, runtime data is distributed among all nodes in the cluster. For example, suppose that a logical switch 1 with VNI 5001 is managed by a controller 1; suppose that a logical switch 2 with VNI 5002 is managed by a controller 2; and suppose that a logical switch 3 with VNI 5003 is managed by a controller 3. In the logical sharding configuration, every node in the control cluster needs to replicate its own managed runtime state to each remote site. Furthermore, every node in the control cluster stores the runtime state information received from every other node from a remote site. Furthermore, on the remote site, since it is also implementing logical sharding, the replicated information needs to be sent to a correct controller. As a result, each logical switch on each site maintains a controller sharding table for each logical switch on both sites as shown in TABLE 1 below.

TABLE 1

| VNI | Site A | Site B |
| --- | --- | --- |
| VNI = 5001 | Controller-1 | Controller-2 |
| VNI = 5002 | Controller-2 | Controller-3 |
| VNI = 5003 | Controller-3 | Controller-1 |
| . . . | . . . | . . . |

6. Runtime State Exchange Between a Physical and a Logical Sharding

In a site that implements logical sharding, runtime data from every node in a first site needs to be replicated to a designated node in a remote site. In a site that implements physical sharding, a designated node needs to split its runtime state based on logical sharding table of the remote site, reflecting a logical switch to controller mapping on remote site and replicate each piece of state data into a correct controller separately.

Figure 4:
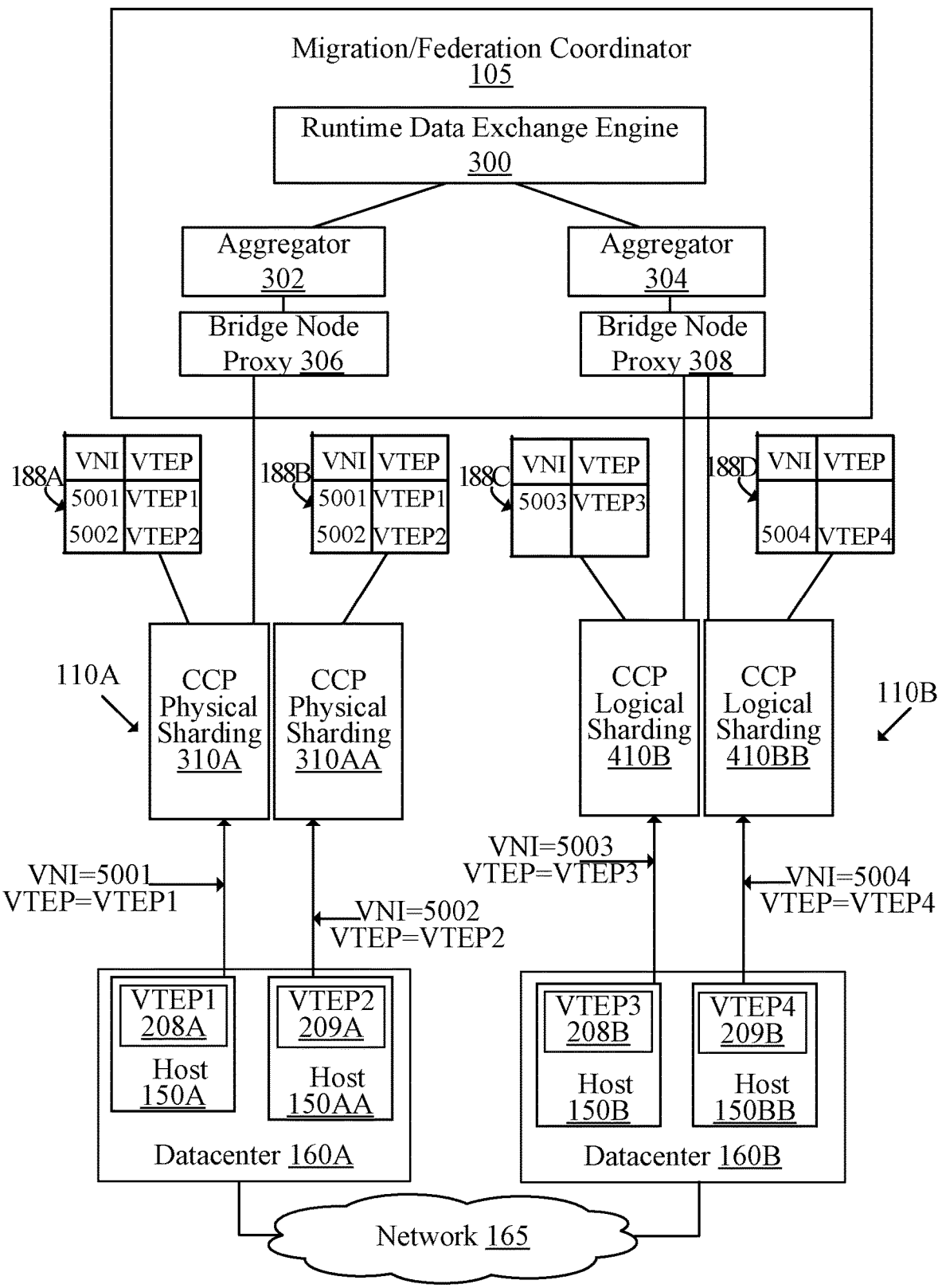
FIG. 4 is a block diagram depicting an example process for collecting runtime state information of datacenters controlled using a physical sharding approach and datacenters controlled using a logical sharding approach.

FIG. 4 is a block diagram depicting an example process for collecting runtime state information of datacenters controlled using a physical sharding approach and datacenters controlled using a logical sharding approach. In the depicted example, CCP cluster 110A implements physical sharding, while CCP cluster 110B implements logical sharding. Since CCP cluster 110A implements physical sharding, VNI/VTEP table 188A and VNI/VTEP table 188B include the same mappings. However, since CCP cluster 110B implements logical sharding, VNI/VTEP table 188C includes the mapping maintained by CCP 410B, while VNI/VTEP table 188D includes the mapping maintained by CCP 410BB. In CCP cluster 110A that implements physical sharding, suppose that CCP node 310A is selected as a node responsible for providing the VNI/VTEP mapping to coordinator 105 and for receiving updates from coordinator 105. Since CCP cluster 110B implements logical sharding, both CCP nodes 310B and 310BB are responsible for providing their VNI/VTEP mapping to coordinator 105 and for receiving runtime state updates from coordinator 105.

Figure 5:
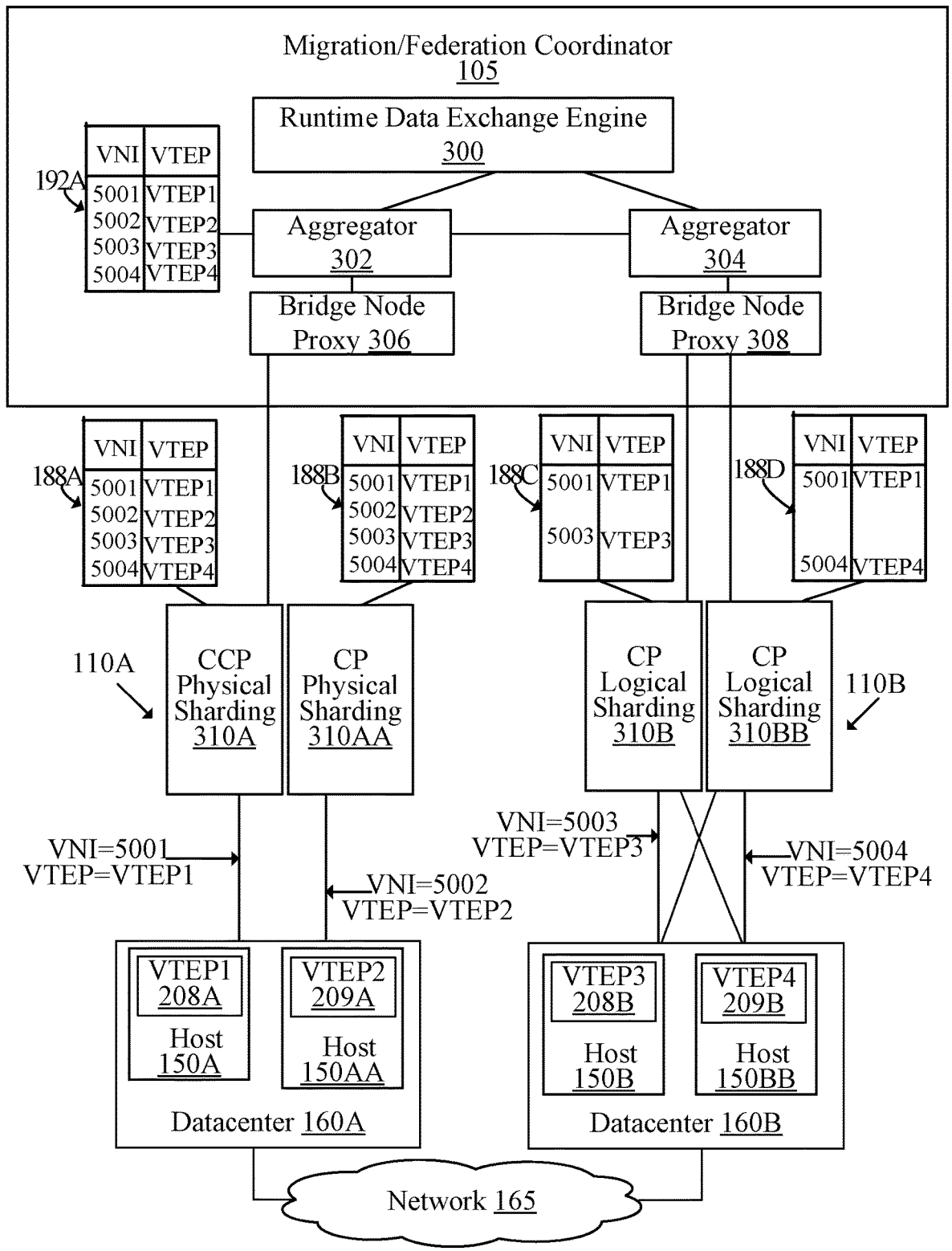
FIG. 5 is a block diagram depicting an example process for exchanging runtime state information of datacenters controlled using a physical sharding approach and datacenters controlled using a logical sharding approach.

FIG. 5 is a block diagram depicting an example process for exchanging runtime state information of datacenters controlled using a physical sharding approach and datacenters controlled using a logical sharding approach. Suppose that CCP cluster 110A implements physical sharding and suppose that CCP node 310A is selected as a node responsible for providing the VNI/VTEP mapping to coordinator 105 and for receiving updates from coordinator 105. Furthermore, suppose that CCP cluster 110B implements logical sharding and suppose that both CCP nodes 310B-310BB provide their VNI/VTEP mappings to coordinator 105 and receive runtime state updates from coordinator 105.

In the depicted example, CCP node 310A provides content of VNI/VTEP table 188A to bridge node proxy 306, while CCP nodes 310B-310BB provide content of VNI/VTEP tables 188C and 188D to bridge node proxy 308.

Upon receiving the contents of the VNI/VTEP tables, bridge node proxies 306-308 communicate the content to aggregators 302-304, respectively.

Upon receiving the contents of the VNI/VTEP tables, aggregators 302-304, respectively, aggregate the received contents to create an aggregated a VNI/VTEP table 192A, and communicate the aggregated runtime state data or updates thereto, to runtime data exchange engine 300.

Upon receiving the aggregated runtime state data, runtime data exchange engine 300 generates, based on the aggregated runtime state data and collected runtime state data, runtime state updates that need to be provided to CCP clusters 110A-110B so that all VNI/VTEP tables 188A, 188B, 188C and 188D contain the VNI/VTEP mappings that are necessary to facilitate traffic routing by hosts 150A, 150AA, 150B and 150BB.

Once engine 300 determines the runtime state updates that need to be provided to CCP clusters 110A-110B, engine 300 communicates the updates to aggregators 302-304, respectively, which in turn, communicate the updates to proxies 306-308, respectively. Proxies 306-308 communicate the updates to CCP clusters 110A-110B, respectively, which in turn update the VNI/VTEP tables maintained by hosts 150A, 105AA, 150B, and 150BB.

7. Example Flow Chart

Figure 6:
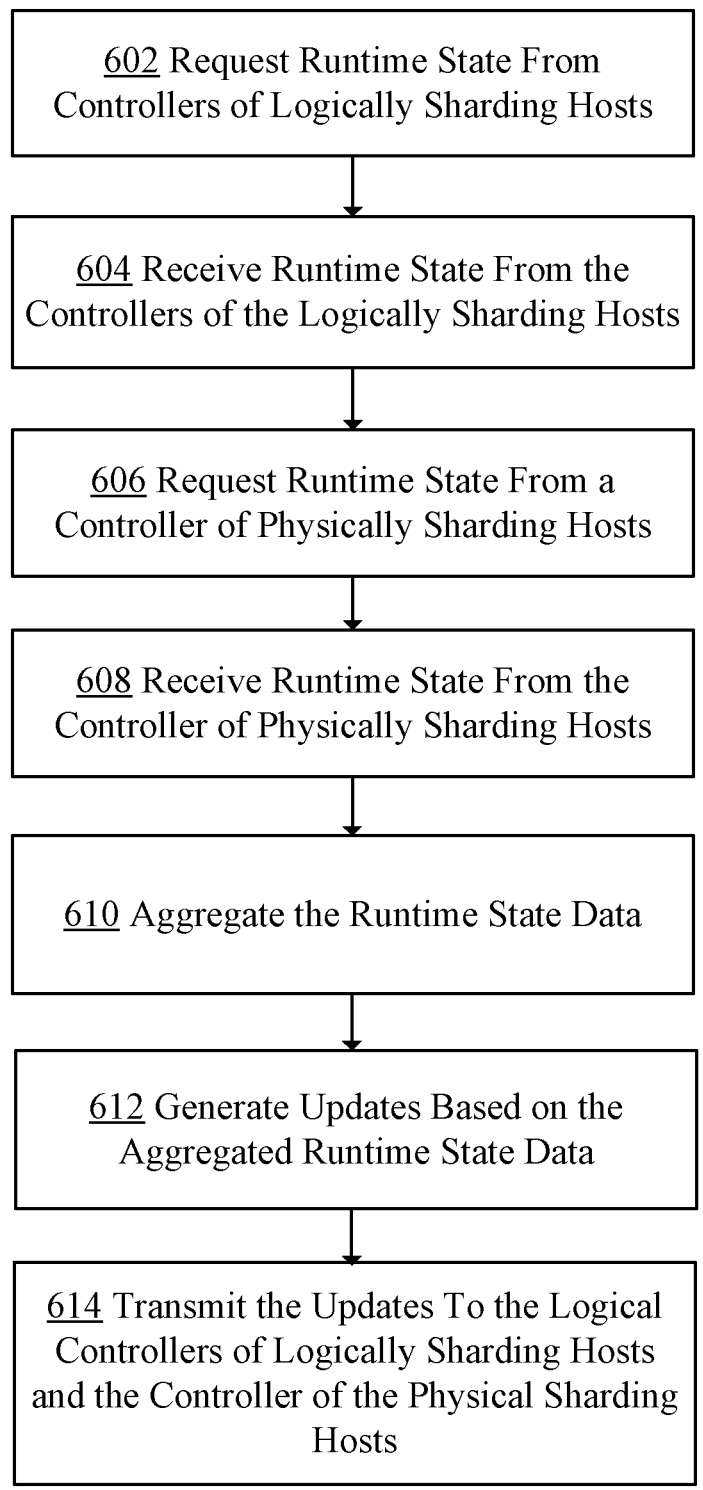
FIG. 6 is an example flow chart for exchanging runtime state information using a controller bridge.

FIG. 6 is an example flow chart for exchanging runtime state information using a controller bridge. In an embodiment, the steps described in FIG. 6 are performed by migration/federation coordinator 105, which is referred to below as a coordinator.

In step 602, a coordinator requests runtime state data from controllers of logical sharding hosts. Referring to FIG. 4, this may include requesting runtime state data from CCP 410B-410BB.

In step 604, the coordinator receives the runtime state data from the controllers of the logical sharding hosts. Referring to FIG. 4, this may include receiving runtime state data from CCP 410B-410BB that control hosts 150B-150BB.

In step 606, the coordinator requests runtime state data from a particular controller of physical sharding hosts. Referring to FIG. 4, this may include requesting runtime state data from CCP 310A.

In step 608, the coordinator receives the runtime state data from the particular controller of the physical sharding hosts. Referring to FIG. 4, this may include receiving runtime state data from CCP 310A of physical sharding hosts 150A-150AA.

In step 610, the coordinator aggregates the received runtime data. Referring to FIG. 5, aggregators 302-304 aggregate the received runtime data to create an aggregated VNI/VTEP table 191A. Furthermore, aggregators 302-304 communicate the aggregated runtime data to runtime data exchange engine 300.

In step 612, the coordinator generates updates based on the aggregated runtime state data. More specifically, for each logical sharding CCP, the coordinator determines a first update state information as a difference between the aggregated runtime state data and a first runtime state data, from one or more first runtime state data, provided by the logical sharding CCP of the one or more logical sharding CCPs. Furthermore, the coordinator determines a first summary by combining one or more second runtime state data received from the particular physical sharding CCP and determining a second update state information as a difference between the aggregated runtime state data and the first summary; and transmitting the second update state information to a particular CCP of the one or more physical sharding CCPs.

In step 614, the coordinator and transmits the updates to the logical controllers of the logical sharding hosts and the updates to the particular controller of the physical sharding hosts. More specifically, the coordinator transmits the first update state information (determined in step 612) to the logical sharding CCPs and transmits the second update state information (determined in step 612) to a particular CCP of the one or more physical sharding CCPs.

8. Examples of Runtime State Data Exchanges

8.1. Collecting Runtime State Data

Figure 7:
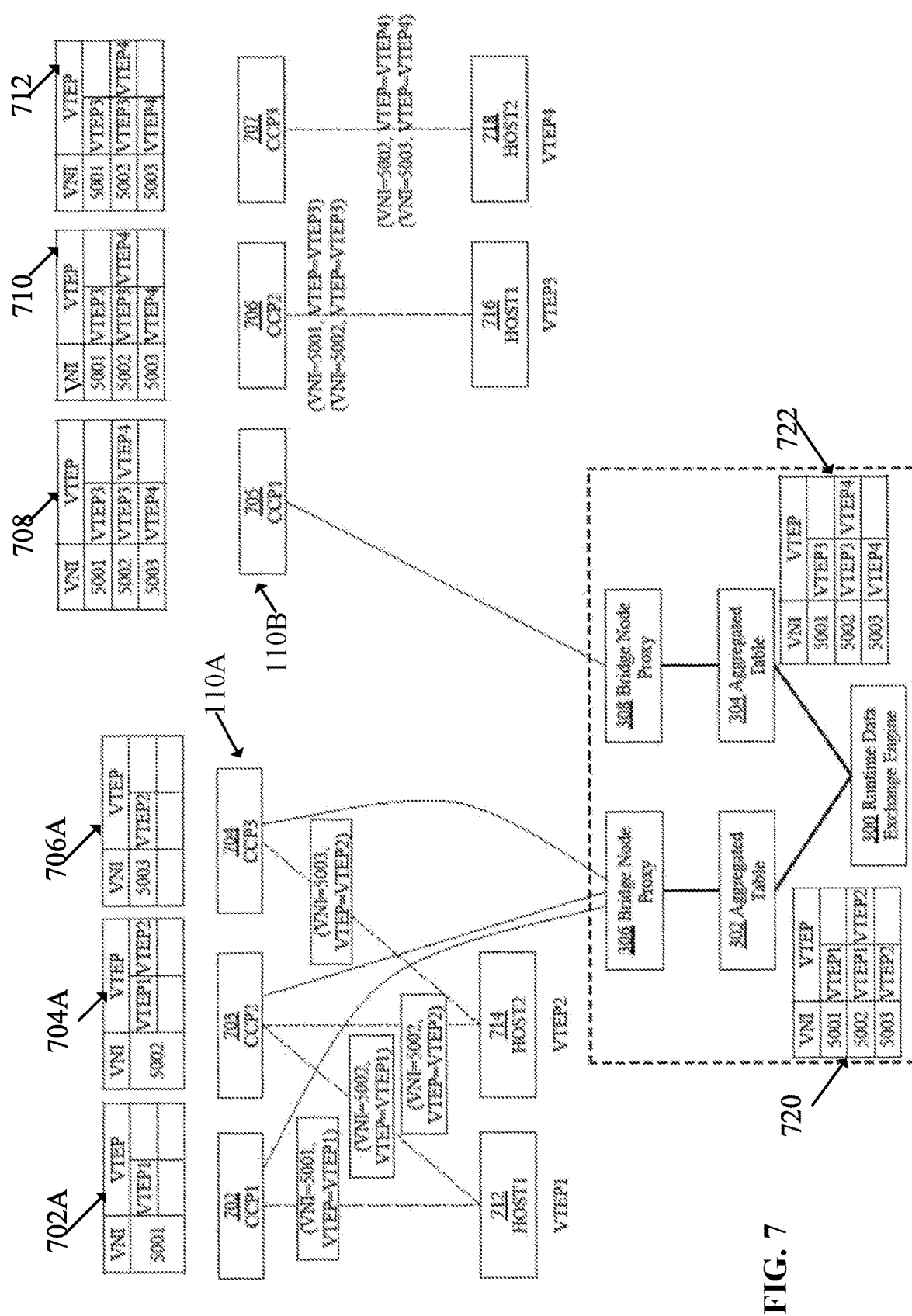
FIG. 7 is a block diagram depicting an example complex process for collecting runtime state information of datacenters controlled using a physical sharding approach and datacenters controlled using a logical sharding approach.

FIG. 7 is a block diagram depicting an example complex process for collecting runtime state information of datacenters controlled using a physical sharding approach and datacenters controlled using a logical sharding approach. Suppose that hosts 712-714 are managed using a logical sharding approach, while hosts 716-718 are managed using a physical sharding approach. Hosts 712-714 are connected to CCP nodes 702, 703, 704, while hosts 716-718 are connected to CCP nodes 705, 706, 707.

CCP node 702 implements logical sharding and manages a logical switch with a VNI 5001, CCP node 703 manages a logical switch with a VNI 5002, and CCP node 704 manages a logical switch with a VNI 5003. Suppose that host 712 has VMs connecting to two logical switches with VNI 5001 and VNI 5002, respectively. Suppose that host 712 reports a local VNI/VTEP mappings [(VNI=5001, VTEP=VTEP1), (VNI=5002, VTEP=VTEP1)] to CCP node 702 and CCP node 703, respectively. Suppose that host 714 reports a local VNI/VTEP mappings [(VNI=5002, VTEP=VTEP2), (VNI=5003, VTEP=VTEP2)] to CCP node 703 and CCP node 704, respectively. Examples of VNI/VTEP mappings are depicted in tables 702A-704A-706A.

Since hosts 716-718 are managed according to a physical sharding approach, CCP nodes 705, 706, and 707 implement physical sharding. Hosts 716-718 are connected to a controller cluster that includes nodes CCP 705, 706, and 707, and each host 716-718 needs to connect to a single CCP node to report the host's runtime state data. Each CCP node 705-757 replicates the runtime data within the CCP cluster. Suppose that host 716 implements VMs that are connected to the logical switches having VNIs 5001 and 5002; therefore, host 716 will report its local VNI/VTEP mapping [(VNI=5001, VTEP=VTEP3), (VNI=5002, VTEP=VTEP3)] to CCP node 706. Suppose that host 718 implements VMs that are connected to the logical switches having VNIs 5002 and 5003; therefore, host 718 will report its local VNI/VTEP mapping [(VNI=5002, VTEP=VTEP4), (VNI=5003, VTEP=VTEP4)] to CCP node 707. Examples of VNI/VTEP mappings are depicted as tables 708, 710, and 712.

The CCP clusters convey the collected runtime state data to runtime data exchange engine 300 to perform runtime data exchange. Since hosts 712-714 implement logical sharding, the controller bridge needs to talk to all logical-sharding controllers of CCP cluster 110A to fetch the runtime state of all connected hosts.

After obtaining the runtime state data of all logical switches, the controller bridge aggregates them together to form an aggregated runtime state. An example of the aggregated runtime state is depicted in a mapping 720.

Since hosts 716-718 implement physical sharding, and since CCP nodes 705, 706, and 707 implement physical sharding, each CCP node 705, 706, and 707 stores the same VNI/VTEP mapping, as shown in tables 708-710-712. Hence it is sufficient if only one of CCP nodes 705, 706, and 707 provides the runtime state data to the controller. Suppose that the controller bridge receives the runtime state data from CCP node 705. An example of the aggregated runtime state is depicted in a mapping 722.

In an embodiment, the aggregated runtime state data is provided to engine 300, which generates updates of the runtime state data, and communicate the updates to proxies 306-308, respectively, which in turn communicate the updates to corresponding CCP nodes 702-707.

8.2. Exchanging Runtime State Data

Figure 8:
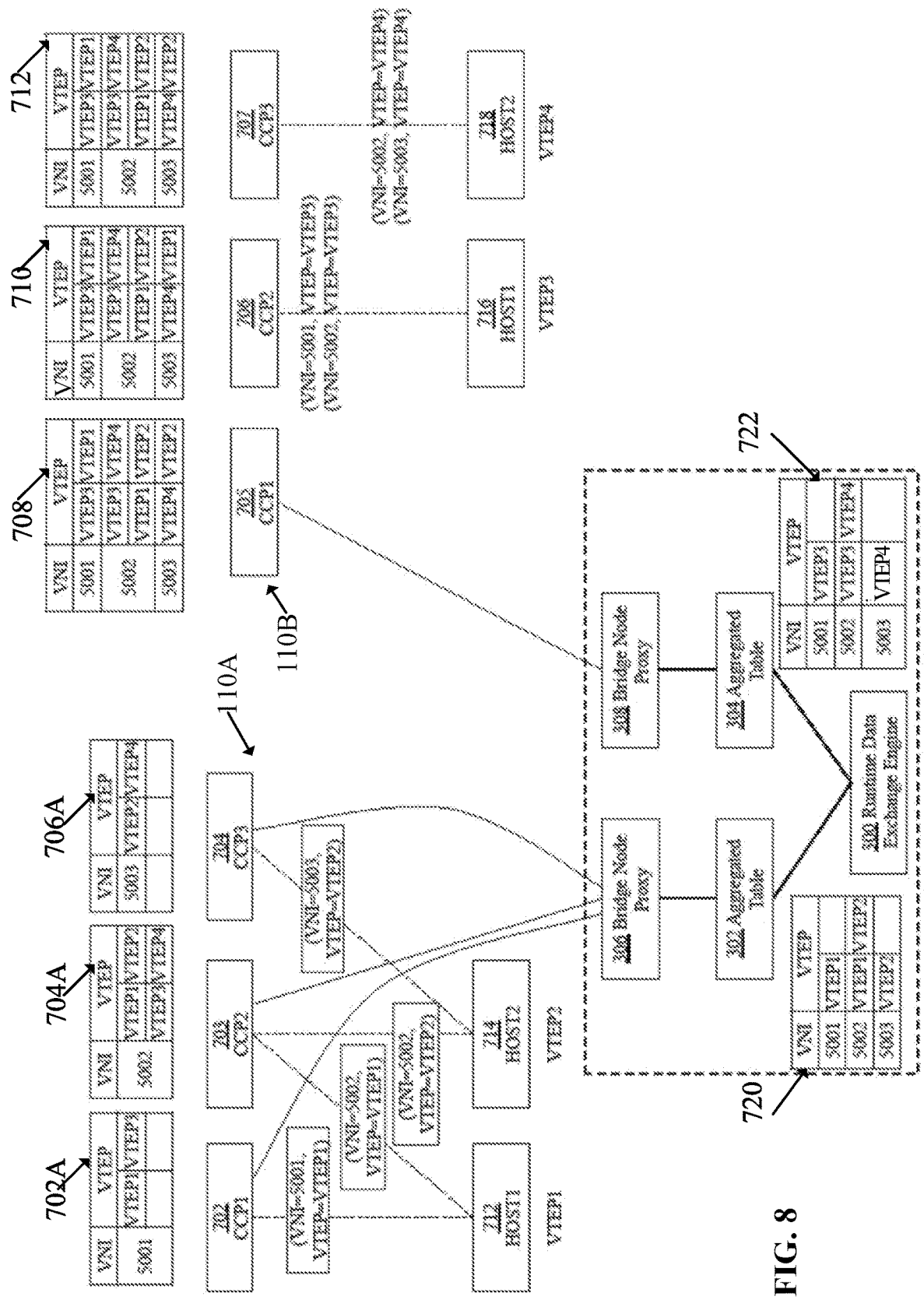
FIG. 8 is a block diagram depicting an example complex process for exchanging runtime state information of datacenters controlled using a physical sharding approach and datacenters controlled using a logical sharding approach.

FIG. 8 is a block diagram depicting an example complex process for exchanging runtime state information of datacenters controlled using a physical sharding approach and datacenters controller using a logical sharding approach. In the depicted example, the VNI/VTEP tables 702A-712 have been updated using the updates provided to CCPs 702-707 by proxies 306-308.

By comparing the contents of tables 702-712 depicted in FIG. 7 with the contents of tables 702A-712 depicted in FIG. 8, it can be noticed that the information about VTEP 1 has been added to tables 708, 710 and 712 for VNIs 5001 and 5002, respectively, the information about VTEP 2 has been added to tables 708, 710 and 712 for VNIs 5002 and 5003, respectively, the information about VTEP3 has been added to table 704A for VNI 5001, the information about VTEP 3 has been added to table 704A for VNI 5002, respectively, and the information about VTEP 4 has been added to tables 704A and 706A, respectively.

In an embodiment, after each CCP node receives runtime state update from the controller bridge, the CCP node propagates the control/forwarding information to the corresponding hosts. Then, each host may encapsulate the corresponding overlay packets and forward the encapsulated packets to a physical network.

Although the provided examples use VTEP tables as examples to illustrate runtime state data exchanges, the approach is not limited to the VTEP tables. The runtime state data exchanges may be also implemented for MAC tables, which may use the mappings in the form of a tuple <VNI, VM MAC, VTEP IP, . . . >. Other examples may include ARP tables, which may use the mappings in the form of a tuple <VNI, VM IP, VM MAC, . . . >.

9. Runtime State Data Exchange when a Topology Changes

In an embodiment, the approach for exchanging runtime state data using a controller bridge are applied to topology changes. The logical topology changes may occur frequently and daily. A VM migration from one host in a datacenter to another host in a datacenter or a different datacenter requires state information to be transferred from the source host to the destination host as well as state information, including VM-to-host mapping at the control plane. Similarly, a user or an administrator may disconnect a VM from one logical switch and connect the VM to a different logical switch. This process will likewise trigger runtime state changes on the affected hosts.

9.1. Exchanging Runtime State Data Upon a VM Migration

Figure 9:
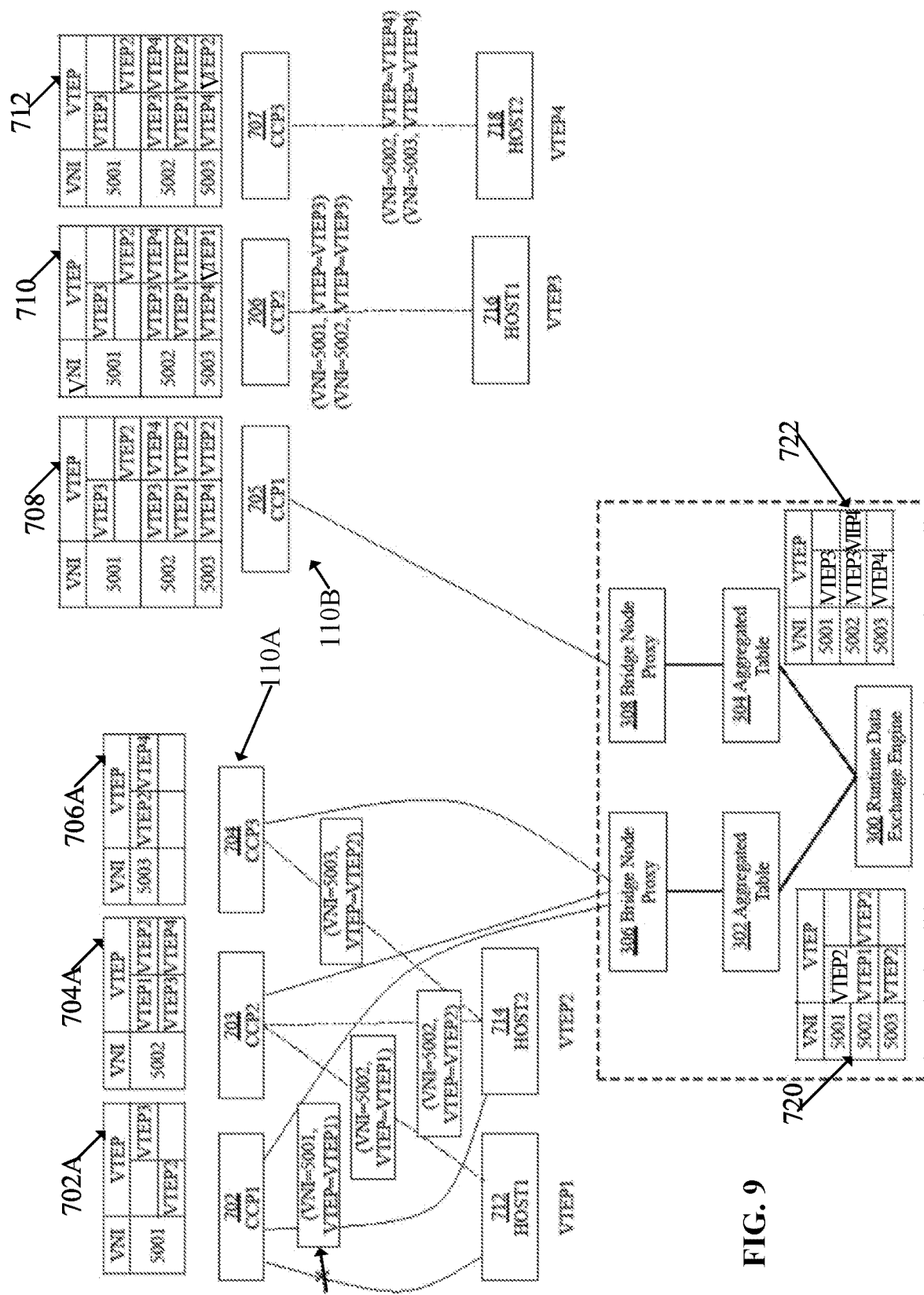
FIG. 9 is a block diagram depicting an example process for exchanging runtime state information of datacenters using a controller bridge in a virtual machine migration case.

FIG. 9 is a block diagram depicting an example process for exchanging runtime state information of datacenters using a controller bridge in a virtual machine migration case. In the depicted example, it is assumed that a VM was disconnected from a logical switch implemented in host 712 and is connected now to a logical switch implemented in host 714. Since the logical topology has changed due to the VM migration, the CCP clusters provide updated runtime state information to runtime data exchange engine 300, and engine 300 determines new updates for the CCP nodes of the CCP clusters.

In an embodiment, the process of collecting the updated runtime state information and generating new updates for the CCP nodes is performed dynamically, not statically. That means that the CCP nodes to not enter a freeze-state during the runtime state during migration. Instead, the runtime date exchange engine 300 dynamically collects the updated runtime state data from the CCP clusters, determines the new updates and distributes the new updates to the CCP clusters as the VM migrates. Hence, the process performed by exchange engine 300 addresses the runtime state data exchange due to the topology changes that affect the datapath traffic between the datacenters.

In the depicted example, the VNI/VTEP tables 702A-712 have been updated using the updates provided to CCPs 702-707 by proxies 306-308.

By comparing the contents of tables 702A-712 depicted in FIG. 8 with the contents of tables 702A-712 depicted in FIG. 9, it can be noticed that the information about VTEP 1 has been removed from tables 702A, 708, 710 and 712 for VNI 5001, and the information about VTEP 2 has been added to tables 702A, 708, 710 and 712 for VNI 5001.

9.2. Exchanging Runtime State Data Upon a Host Migration

In some situations, a host is disconnected from one datacenter control plane and connected to another datacenter control plane. This is usually referred to a host migration. This can happen when a host is physically moved or when a datacenter control plane is upgraded or transitions from one SDN product line to another SDN product line. This process will trigger runtime state changes on the affected hosts and datacenters. This may, for example, trigger runtime state changes in both source and destination datacenters. The changes may include changes in the VTEP information for a logical switch since some VNI/VTEP mappings will be removed from some CCPs of a source site and some VNI/VTEP mappings will be added to some CCPs of a destination site. The changes impact the datapath traffic exchanged between the source site and the destination site. The process presented herein and performed by exchange engine 300 addresses the runtime state data exchange due to the topology changes that affect the datapath traffic between the datacenters.

Figure 10:
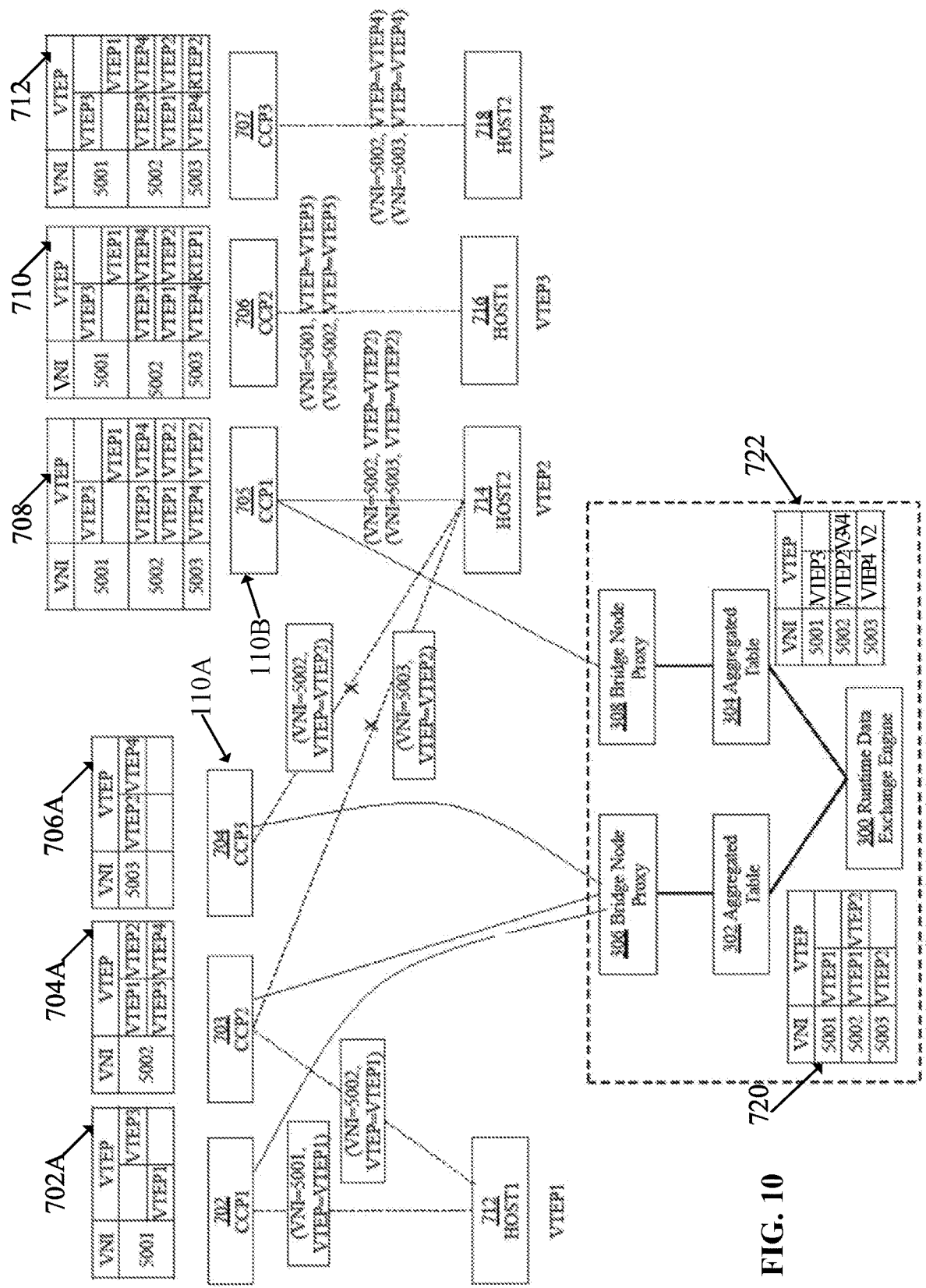
FIG. 10 is a block diagram depicting an example process for exchanging runtime state information of datacenters using a controller bridge in a host migration case.

FIG. 10 is a block diagram depicting an example process for exchanging runtime state information of datacenters using a controller bridge in a host migration case. In the depicted example, suppose that host 714 moves from the logical sharding site managed by CCPs 702-703-704 to the physical sharding site managed by CCPs 705-706-707. Since host 714 disconnects from CCP 703 (as previously shown in FIG. 7) and connects to CCP 705, the runtime information of host 714 needs to be removed. The current runtime state data is propagated to the controller bridge, and aggregator 302 aggregates the current data, as shown in table 720. Aggregator 302 propagates the changes to CCPs 702-704-706, and CCPs 702-704-706 remove the information about VTEP 2 from all cluster nodes. Therefore, the VTEP2 information is removed from VNI/VTEP 704A-706A. Accordingly, the VTEP2 information is removed from table 704A for VNI 5002, and the VTEP 2 information is removed from table 706A for VNI 5003.

On the other hand, after host 714 connects to CCP 705, it reports its local runtime state [(VNI=5002, VTEP=VTEP2), (VNI=5003, VTEP=VTEP3)] to its master controller, such as CCP 705. The runtime state in all nodes of CCPs 705-706-707 cluster is then updated accordingly. Therefore, the VTEP2 information is added into the VTEP table of logical switches with both VNI 5002 and 5003. The change is then propagated to the controller bridge, and aggregator 304 aggregates the changes, as reflected in table 722. The controller bridge then propagates the changes to CCPs 702-703-704 cluster, so both CCP 703 and CCP 704 can update their tables 704A and 706A, respectively, of their managed logical switches. Here, for example, the VTEP2 information is added back to VNI/VTEP tables 704A-706A of both logical switches with VNI 5002 and 5003 on CCPs 703-704, respectively.

Even though in this case, the contents of the tables look unchanged (as may be concluded by comparing the contents of VNI/VTEP tables 702A-712 in FIG. 8 and in FIG. 10), the runtime state data exchange had to be performed to ensure that the host migration is properly reflected in the contents of the tables.

10. Exchanging Runtime State Data with a Gateway

Figure 11:
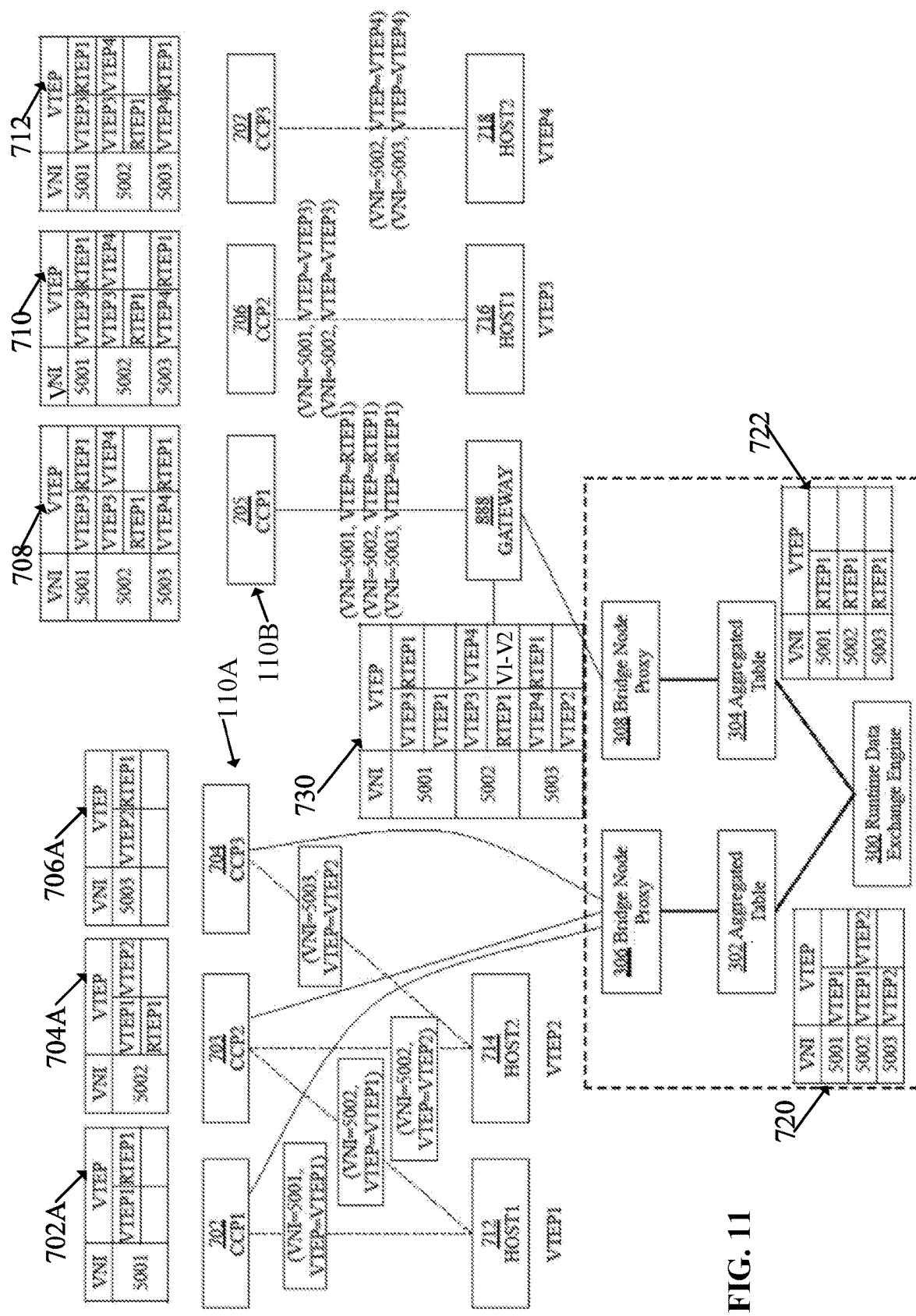
FIG. 11 is a block diagram depicting an example process for exchanging runtime state information with a gateway using a controller bridge.

FIG. 11 is a block diagram depicting an example process for exchanging runtime state information with a gateway using a controller bridge. In some situations, hosts within one datacenter cannot encapsulate and forward traffic directly to other hosts within other datacenters. In such situations, all traffic needs to be directed via a gateway (or gateways) that is usually implemented on an edge of a datacenter. In this situation, the internal runtime state of the hosts is not exposed directly to remote sites, and instead it is translated to the states maintained by the gateway.

Suppose that hosts 712-714 operate without a gateway and hosts 716-718 operate with a gateway (or gateways). For the clarity of the description, hosts 716-718 operate with a gateway 888, as depicted in FIG. 11. The approach, however, is not limited to a single gateway configuration; the approach supports multiple gateways configured for load balancing purposes as well. A VTEP implemented in gateway 888 is referred to as a remote tunnel end point ("RTEP1") (not shown). The RTEP is used to perform the packet encapsulation and to receive the packets from remote sites.

Suppose that hosts 712-714 are managed using a logical sharding approach, and therefore, a controller bridge connects to all CCP 702-704-706 in the cluster to collect runtime state data from CCP 702-704-706 and to provide updated runtime state data to CCP 702-704-706.

Suppose that hosts 716-718 are managed using a physical sharding approach and all traffic needs to pass through gateway 888. Gateway 888 needs to join the membership group of all logical switches implemented in the CCPs 705-706-707 cluster to be able to communicate the traffic. Therefore, gateway 888 reports the gateway's VTEPs and sends to CCP 705 the following: (VNI=5001, VTEP=RTEP1), (VNI=5002, VTEP=RTEP1), (VNI=5003, VTEP=RTEP1).

In an embodiment, since hosts 716-718 use gateway 888 to communicate the traffic, the controller bridge does not connect to CCPs 705-706-707; instead, the controller bridge connects to gateway 888 to obtain and exchange the runtime state data. There are two reasons for doing so. The first reason is that by connecting directly to gateway 888, the controller bridge does not need to expose remote runtime information directly to hosts 716-718 since this information should be hidden from the internal hosts 716-718. The second reason is that since gateway 888 already has all required runtime information for the state data exchange with other datacenters, there is no need for the controller bridge to connect directly to hosts 716-718.

In the depicted example, a table 730, maintained by gateway 888, includes the mappings in which all logical switches include only VTEPs implemented within a hosts 716-718 datacenter.

Aggregated table 722 only includes the RTEP1 information, and all VTEPs of internal hosts 716-718 are filtered out. Aggregated table 720, however, includes all VTEPs of hosts 712-714.

To facilitate traffic communication between hosts 712-718, the controller bridge connecting to gateway 888 needs to perform some translations. To perform the translation, the controller bridge may exchange the runtime information of all internal VTEPs of hosts 712-714 with external RTEPs from hosts 716-718. The result in shown in a VNI/VTEP table 730, in which the RTEP1 information is appended in table 730 for each VNI of the corresponding logical switches on hosts 712-714 site, and the VTEP information of hosts 7120714 is appended in table 730 for each VNI of the corresponding switches of hosts 716-718. Then, gateway 888 will use the contents of aggregated table 730 for packet encapsulation and packet forwarding between internal hosts 716-718 and remote hosts 712-714.

11. Multiple Sites Support

In some situations, two or more sites interconnect with each other, and therefore, runtime state data of each site needs to be exchanged with other sites. As the count of sites increases, a single bridge node might not be able to perform the runtime state data exchange for all the sites efficiently and quickly. Therefore, the single bridge node may need to be replaced by a cluster of control bridge nodes. The control bridge clusters may be organized as hierarchical clusters or centralized clusters.

11.1. Example Centralized Control Bridge Cluster

Figure 12:
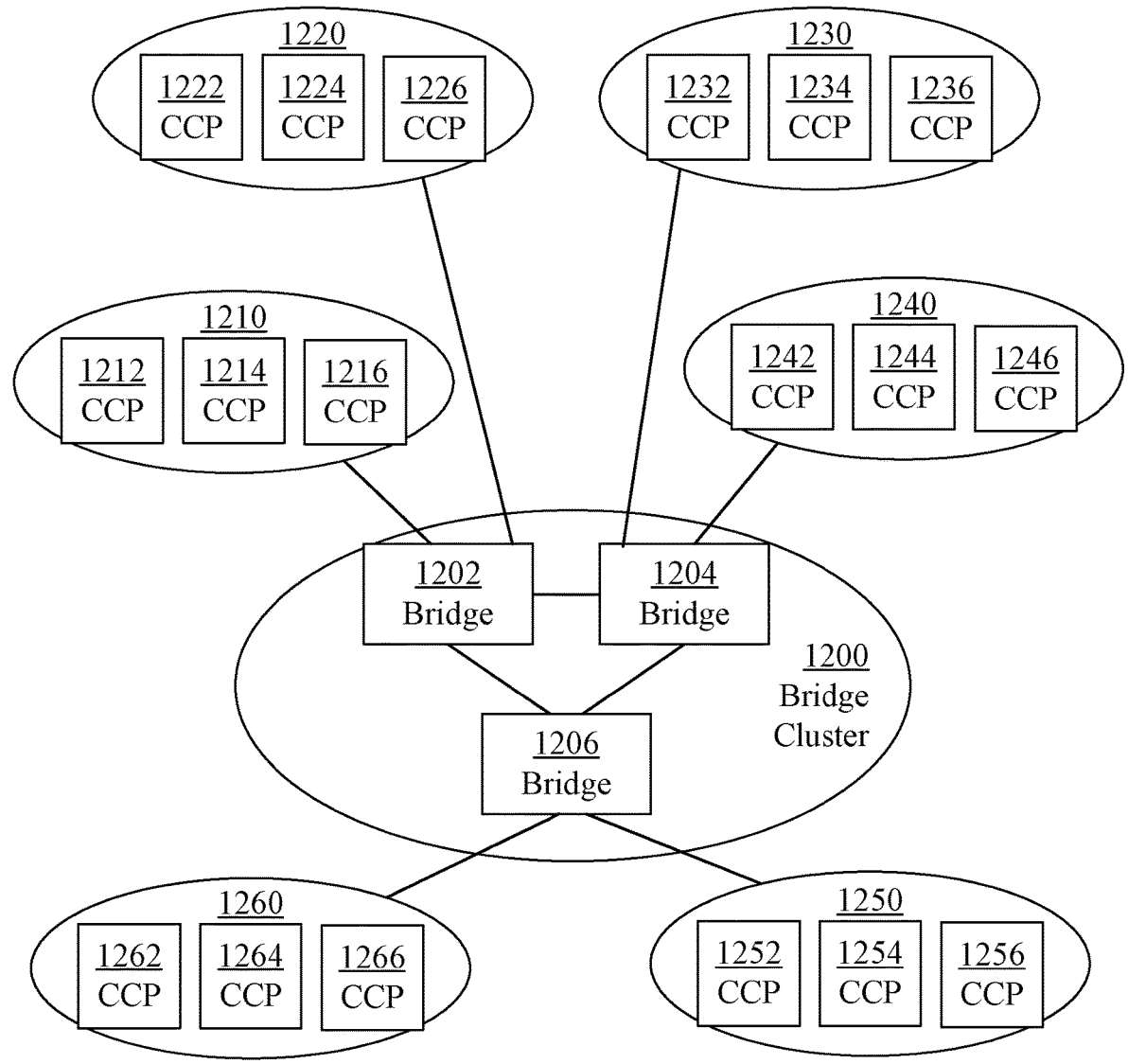
FIG. 12 is a block diagram depicting an example centralized bridge control cluster configuration.

FIG. 12 is a block diagram depicting an example centralized bridge control cluster configuration. In the depicted example, a control bridge cluster 1200 includes three bridge nodes 1202, 12040 and 1206. However, the approach is not limited to such clusters; other clusters may include fewer or additional bridge nodes.

In an embodiment, one or more datacenters connects to a single bridge node for the runtime state exchange purposes. For example, a datacenter 1210 with CCPs 1212, 1214 and 1216 and a datacenter 1200 with CCPs 1222, 1224 and 1226 connect to bridge 1202. A datacenter 1230 with CCPs 1232, 1234 and 1236 and a datacenter 1240 with CCPs 1242, 1244 and 1246 connect to bridge 1204. A datacenter 1250 with CCPs 1252, 1254 and 1256 and a datacenter 1260 with CCPs 1262, 1264 and 1266 connect to bridge 1206.

Internally, bridge nodes 1202-1204-1206 form a cluster and are configured to exchange the runtime state among themselves as well. The bridge cluster may run on top of distributed coordination service, such as the Zookeeper, to provide both fault tolerance and load balancing functionalities. Functionally, the bridge cluster operates similarly to a controller cluster implemented within each datacenter. Therefore, the bridge cluster may be treated as a simplified controller cluster. The bridge cluster and controller cluster within each datacenter form a hierarchical control plane.

11.2. Example Hierarchical Bridge Cluster

Figure 13:
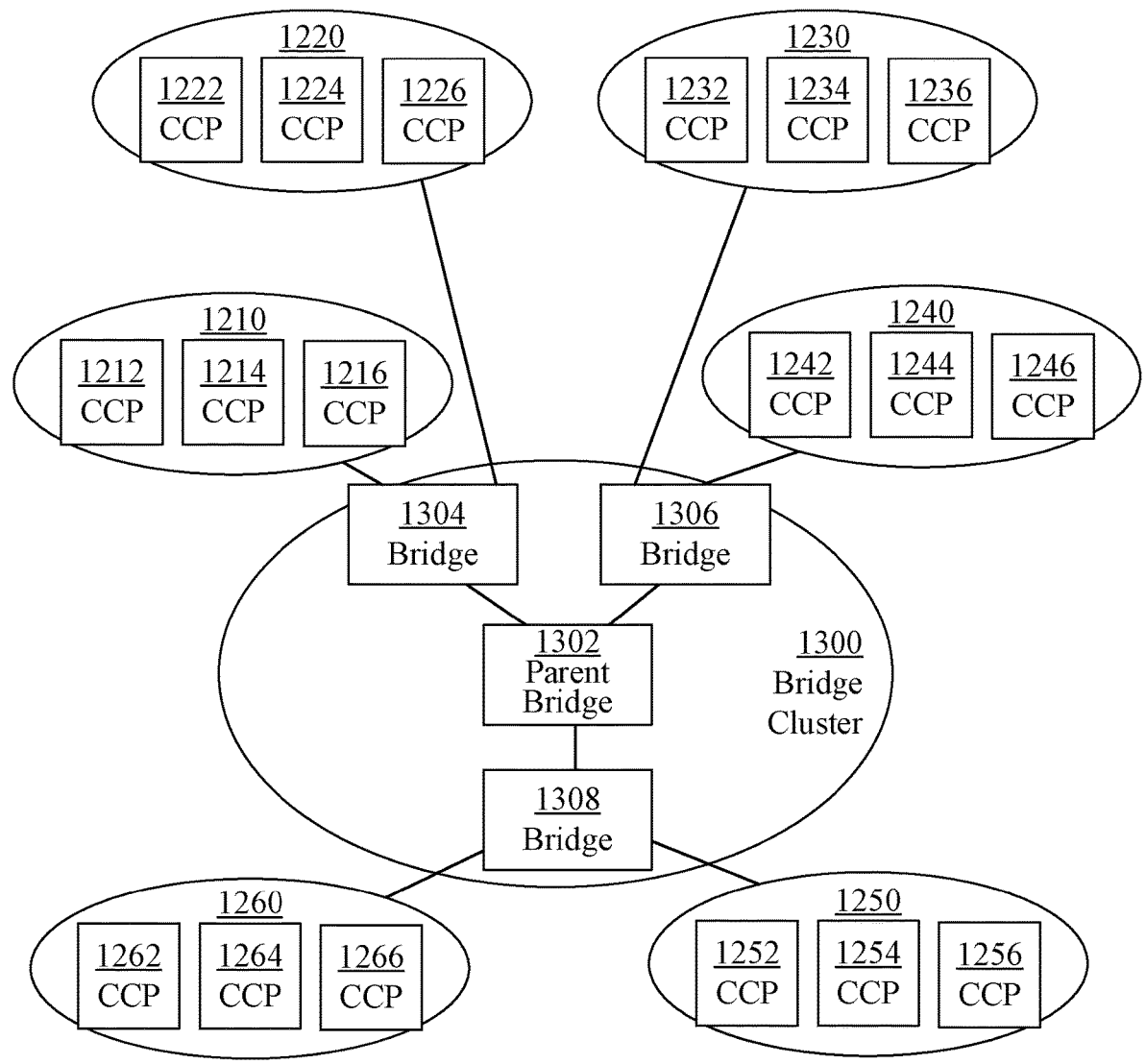
FIG. 13 is a block diagram depicting an example hierarchical bridge control cluster configuration.

FIG. 13 is a block diagram depicting an example hierarchical bridge control cluster configuration. In the depicted example, a hierarchical bridge control cluster 1300 includes a parent bridge 1302 and a plurality of bridges 1304, 1306, and 1308.

Parent bridge 1302 coordinates the runtime data exchanges while each bridge node 1304/1306/1308 is responsible for exchanging runtime data of actual datacenters 1220-1250.

Bridge nodes 1304, 1306 and 1308 connect to parent central bridge 1302 to facilitate the runtime data exchange with other bridge nodes.

12. Improvements Provided by Certain Embodiments

In an embodiment, an approach for exchanging runtime state information between datacenters using a controller bridge allows seamlessly and dynamically exchange runtime data during migration and/or federation of components of an SDN-managed network. Exchanging the runtime data is critical to the SDN-managed components migration and federation as different products are implemented on the components.

In an embodiment, a federation of datacenters into one datacenter is enabled by dynamically exchanging runtime information directly between central control plane clusters implemented in the datacenters. The approach allows federating the datacenters of the same type and of the different types. Furthermore, the approach allows federating the datacenters without significant modifications to the existing architecture of the datacenters.

In an embodiment, to facilitate a federation and a migration of components of one datacenter from one type of product to another type of product, a bridge node is implemented as a special type of a transport node and reuses the existing local control plane implementation to exchange the runtime state. That node is not involved in traffic forwarding. The bridge node may be implemented as a cluster for load balancing and fault tolerance, if needed.

In an embodiment, a controller bridge supports exchanging runtime information with and without gateways. Therefore, the approach is applicable to configurations in which all traffics passes through gateways and the configuration in which some traffic is communicated between different sites directly.

13. Implementation Mechanisms

The present approach may be implemented using a computing system comprising one or more processors and memory. The one or more processors and memory may be provided by one or more hardware machines. A hardware machine includes a communications bus or other communication mechanisms for addressing main memory and for transferring data between and among the various components of hardware machine. The hardware machine also includes one or more processors coupled with the bus for processing information. The processor may be a microprocessor, a system on a chip (SoC), or other type of hardware processor.

Main memory may be a random-access memory (RAM) or other dynamic storage device. It may be coupled to a communications bus and used for storing information and software instructions to be executed by a processor. Main memory may also be used for storing temporary variables or other intermediate information during execution of software instructions to be executed by one or more processors.

14. General Considerations

Although some of various drawings may illustrate a number of logical stages in a particular order, stages that are not order dependent may be reordered and other stages may be combined or broken out. While some reordering or other groupings may be specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described regarding specific embodiments. However, the illustrative embodiments above are not intended to be exhaustive or to limit the scope of the claims to the precise forms disclosed. Many modifications and variations are possible in view of the above teachings. The embodiments were chosen to best explain the principles underlying the claims and their practical applications, to thereby enable others skilled in the art to best use the embodiments with various modifications as are suited to the uses contemplated.

Any definitions set forth herein for terms contained in the claims may govern the meaning of such terms as used in the claims. No limitation, element, property, feature, advantage or attribute that is not expressly recited in a claim should limit the scope of the claim in any way. The specification and drawings are to be regarded in an illustrative rather than a restrictive sense.

What is claimed is:

1. A computer-implemented method for exchanging runtime state information between datacenters using a controller bridge, the method comprising:

receiving one or more first runtime state data from one or more logical sharding central control planes ("CCPs") controlling one or more logical sharding hosts;

receiving one or more second runtime state data from one or more physical sharding CCPs controlling one or more physical sharding hosts;

aggregating, to aggregated runtime state data, the one or more first runtime state data received from the one or more logical sharding CCPs and the one or more second runtime state data received from the one or more physical sharding CCPs;

determining updated runtime state data based on the aggregated runtime state data, the one or more first runtime state data, and the one or more second runtime state data; and transmitting, by the controller bridge, the updated runtime state data to at least one of the one or more logical sharding CCPs or at least one of the one or more physical sharding CCPs, the at least one or more logical sharding CCPs or the at least one or more physical sharding CCPs using the updated runtime data to manage or control logical switches or virtual switches.

2. The computer-implemented method of claim 1, wherein the updated runtime state data is determined and transmitted to CCPs dynamically and without freezing traffic forwarding operations; and wherein the updated runtime state data includes forwarding table information, including a mapping between virtual network identifiers ("VNIs") of logical routers configured in sharding hosts and virtual tunnel endpoints ("VTEPs") established within a logical network.

3. The computer-implemented method of claim 1, further comprising: determining a first update state information as a difference between the aggregated runtime state data and a first runtime state data, from the one or more first runtime state data, provided by a logical sharding CCP of the one or more logical sharding CCPs; and transmitting the first update state information to the logical sharding CCP.

4. The computer-implemented method of claim 3, further comprising: determining a first summary by combining the one or more second runtime state data and determining a second update state information as a difference between the aggregated runtime state data and the first summary; and transmitting the second update state information to a particular CCP of the one or more physical sharding CCPs.

5. The computer-implemented method of claim 4, further comprising: causing receiving, by the logical sharding CCP, of the one or more logical sharding CCPs, the first update state information; and causing the logical sharding CCP to use the first update state information to update a mapping between VNIs and corresponding VTEPs implemented in the one or more logical sharding hosts managed by the one or more logical sharding CCP.

6. The computer-implemented method of claim 5, further comprising: causing receiving, by a particular physical sharding CCP of the one or more physical sharding CCP, the second update state information, and causing the particular physical sharding CCP to store the second update state information in a mapping between VNIs and corresponding VTEPs implemented in a physical sharding host managed by the particular physical sharding CCP.

7. The computer-implemented method of claim 1, wherein each of the one or more logical sharding hosts is running at least one VTEP, of one or more first VTEPs, and each of the one or more physical sharding hosts is running at least one VTEP of one or more second VTEPs.

8. One or more non-transitory computer-readable storage media storing one or more computer instructions which, when executed by one or more processors, cause the one or more processors to perform:
   receiving one or more first runtime state data from one or more logical sharding central control planes ("CCPs") controlling one or more logical sharding hosts;
   receiving one or more second runtime state data from one or more physical sharding CCPs controlling one or more physical sharding hosts;
   aggregating, to aggregated runtime state data, the one or more first runtime state data received from the one or more logical sharding CCPs and the one or more second runtime state data received from the one or more physical sharding CCPs;
   determining updated runtime state data based on the aggregated runtime state data, the one or more first runtime state data, and the one or more second runtime state data; and
   transmitting the updated runtime state data to at least one of the one or more logical sharding CCPs or at least one of the one or more physical sharding CCPs, the at least one or more logical sharding CCPs or the at least one or more physical sharding CCPs using the updated runtime data to manage or control logical switches or virtual switches.

9. The one or more non-transitory computer-readable storage media of claim 8, wherein the updated runtime state data is determined and transmitted to CCPs dynamically and without freezing traffic forwarding operations; and
   wherein the updated runtime state data includes forwarding table information, including a mapping between virtual network identifiers ("VNIs") of logical routers configured in sharding hosts and virtual tunnel endpoints ("VTEPs") established within a logical network.

10. The one or more non-transitory computer-readable storage media of claim 9, storing additional instructions for: determining a first update state information as a difference between the aggregated runtime state data and a first runtime state data, from the one or more first runtime state data, provided by a logical sharding CCP of the one or more logical sharding CCPs; and transmitting the first update state information to the logical sharding CCP.

11. The one or more non-transitory computer-readable storage media of claim 10, storing additional instructions for: determining a first summary by combining the one or more second runtime state data and determining a second update state information as a difference between the aggregated runtime state data and the first summary; and transmitting the second update state information to a particular CCP of the one or more physical sharding CCPs.

12. The one or more non-transitory computer-readable storage media of claim 11, storing additional instructions for: causing receiving, by the logical sharding CCP, of the one or more logical sharding CCPs, the first update state information; and causing the logical sharding CCP to use the first update state information to update a mapping between VNIs and corresponding VTEPs implemented in the one or more logical sharding hosts managed by the one or more logical sharding CCP.

13. The one or more non-transitory computer-readable storage media of claim 12, storing additional instructions for: causing receiving, by a particular physical sharding CCP of the one or more physical sharding CCP, the second update state information, and causing the particular physical sharding CCP to store the second update state information in a mapping between VNIs and corresponding VTEPs implemented in a physical sharding host managed by the particular physical sharding CCP.

14. The one or more non-transitory computer-readable storage media of claim 8, wherein each of the one or more logical sharding hosts is running at least one VTEP, of one or more first VTEPs, and each of the one or more physical sharding hosts is running at least one VTEP of one or more second VTEPs.

15. A control bridge implemented in a computer network and configured to implement mechanisms for dynamically exchanging runtime state data between datacenters, the control bridge comprising:
   one or more processors; one or more memory units; and
   one or more non-transitory computer-readable storage media storing one or more computer instructions which, when executed by the one or more processors, cause the one or more processors to perform:
      receiving one or more first runtime state data from one or more logical sharding central control planes ("CCPs") controlling one or more logical sharding hosts;

receiving one or more second runtime state data from one or more physical sharding CCPs controlling one or more physical sharding hosts;

aggregating, to aggregated runtime state data, the one or more first runtime state data received from the one or more logical sharding CCPs and the one or more second runtime state data received from the one or more physical sharding CCPs;

determining updated runtime state data based on the aggregated runtime state data, the one or more first runtime state data, and the one or more second runtime state data; and transmitting the updated runtime state data to at least one of the one or more logical sharding CCPs or at least one of the one or more physical sharding CCPs, the at least one or more logical sharding CCPs or the at least one or more physical sharding CCPs using the updated runtime data to manage or control logical switches or virtual switches.

16. The control bridge of claim 15, storing additional instructions for:

determining a first update state information as a difference between the aggregated runtime state data and a first runtime state data, from the one or more first runtime state data, provided by a logical sharding CCP of the one or more logical sharding CCPs; and transmitting the first update state information to the logical sharding CCP.

17. The control bridge of claim 16, storing additional instructions for:

determining a first summary by combining the one or more second runtime state data and determining a second update state information as a difference between the aggregated runtime state data and the first summary; and transmitting the second update state information to a particular CCP of the one or more physical sharding CCPs.

18. The control bridge of claim 17, storing additional instructions for:

causing receiving, by the logical sharding CCP, of the one or more logical sharding CCPs, the first update state information; and causing the logical sharding CCP to use the first update state information to update a mapping between VNIs and corresponding VTEPs implemented in the one or more logical sharding hosts managed by the one or more logical sharding CCP.

19. The control bridge of claim 18, storing additional instructions for:

causing receiving, by a particular physical sharding CCP of the one or more physical sharding CCP, the second update state information, and causing the particular physical sharding CCP to store the second update state information in a mapping between VNIs and corresponding VTEPs implemented in a physical sharding host managed by the particular physical sharding CCP.

20. The control bridge of claim 19, wherein each of the one or more logical sharding hosts is running at least one VTEP, of one or more first VTEPs, and each of the one or more physical sharding hosts is running at least one VTEP of one or more second VTEPs.

* * * * *